United States Patent
Dasgupta et al.

(10) Patent No.: US 8,230,249 B2
(45) Date of Patent: Jul. 24, 2012

(54) DYNAMIC SELECTION OF SERVER STATES FOR SERVERS IN A CLUSTER OF SERVERS

(75) Inventors: Gargi B. Dasgupta, Gurgaon (IN); Anindya Neogi, New Delhi (IN); Akshat Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 451 days.

(21) Appl. No.: 12/503,246

(22) Filed: Jul. 15, 2009

(65) Prior Publication Data

US 2011/0016339 A1    Jan. 20, 2011

(51) Int. Cl.
*G06F 1/32* (2006.01)
(52) U.S. Cl. ......................... 713/323; 713/320
(58) Field of Classification Search .................. 713/323, 713/320
See application file for complete search history.

(56) References Cited

U.S. PATENT DOCUMENTS

| | | | |
|---|---|---|---|
| 7,272,735 B2 | 9/2007 | Fung | |
| 7,441,135 B1 | 10/2008 | Chan et al. | |
| 7,536,461 B2 * | 5/2009 | Stecher et al. | 709/226 |
| 7,987,463 B2 * | 7/2011 | Kim et al. | 718/100 |
| 8,041,967 B2 * | 10/2011 | Belady et al. | 713/320 |
| 2007/0094379 A1 | 4/2007 | Stecher et al. | |
| 2008/0046559 A1 * | 2/2008 | Langer et al. | 709/224 |
| 2010/0218005 A1 * | 8/2010 | Jain et al. | 713/300 |

FOREIGN PATENT DOCUMENTS

WO    WO 2004/049157 A2    6/2004

OTHER PUBLICATIONS

Chen et al., Energy-Aware Server Provisioning and Load Dispatching for Connection-Intensive Internet Services, NSDI'08: 5th USENIX Symposium on Networked System Design and Implementation, pp. 337-350.
Verma et al., pMapper: Power and Migration Cost Aware Application Placement in Virtualized Systems.
Irani et al., Online Strategies for Dynamic Power Management in Systems with Multiple Power-Saving States, ACM Transactions on Embedded Computing Systems, vol. 2, No. 3, Aug. 2003, pp. 325-346.

* cited by examiner

*Primary Examiner* — Chun Cao
(74) *Attorney, Agent, or Firm* — Ryan, Mason & Lewis, LLP

(57) ABSTRACT

Techniques for dynamically selecting a server state for one or more servers in a cluster of servers are provided. The techniques include tracking each active and sleep state of each server in a cluster of servers, and selecting a server state for one or more servers in the cluster of servers to meet one or more workload level requirements of the cluster of servers, wherein selecting a server state for one or more servers comprises scheduling a transition between one or more active and sleep states for the one or more servers, wherein scheduling the transition comprises using power consumption information for each state and transition time information for each transition.

20 Claims, 2 Drawing Sheets

DYNAMIC SELECTION OF SERVER STATES FOR SERVERS IN A CLUSTER OF SERVERS

FIELD OF THE INVENTION

Embodiments of the invention generally relate to information technology, and, more particularly, to power management.

BACKGROUND OF THE INVENTION

Data centers can often be over-provisioned, lacking computing capacity available to handle workload peaks. During normal workloads, servers in a datacenter cluster can often run at low utilization but still consume a high amount of power. The challenge is to shut down servers when not needed and wake them up when necessary. As such, however, dynamic power management through server state assignment is not a trivial problem.

One challenge is to determine which servers can remain in an operating state and which can be sent to sleep to save power. Also, there can be multiple operating and sleep states. Energy and performance overheads in sleep-state transition are not negligible, and a simple greedy algorithm that makes the system enter the deepest sleep state when idling is inadequate. With respect to sleep-state transitioning, overhead can include storing processor state and turning off power, and waking up takes a finite amount of time and power.

SUMMARY OF THE INVENTION

Principles and embodiments of the invention provide techniques for dynamic selection of server states. An exemplary method (which may be computer-implemented) for dynamically selecting a server state for one or more servers in a cluster of servers, according to one aspect of the invention, can include steps of tracking each active and sleep state of each server in a cluster of servers, and selecting a server state for one or more servers in the cluster of servers to meet one or more workload level requirements of the cluster of servers, wherein selecting a server state for one or more servers comprises scheduling a transition between one or more active and sleep states for the one or more servers, wherein scheduling the transition comprises using power consumption information for each state and transition time information for each transition.

One or more embodiments of the invention or elements thereof can be implemented in the form of a computer product including a tangible computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Principles of the invention include dynamic selection of server states in a cluster for power management. The techniques described herein include a power-aware methodology to reduce node energy consumption by exploiting both sleep state and active power management.

As detailed herein, state transitions may consume additional power. For example, transition between states may take finite time and power, and transition between states can be instantaneous with a power spike. Workloads may be spread across servers, and a request can require multiple servers to serve it. Additionally, dependencies exist between servers and their state selection. For example, a server's state selection can depend on another server's power state.

As such, one or more embodiments of the invention include assigning the correct operating state of a server in order to optimize power consumption in a server cluster. By way or example, the techniques described herein can include determining a combination of active and sleep states for a heterogeneous set of servers, such that power is minimized and performance is not affected. Because of the heterogeneity of servers, each server can have different sleep and active states, all of which have different power requirements.

Further, in one or more embodiments of the invention, a schedule for servers to either wake up when workload arrives or to go to a low power sleep mode when there is reduced workload can also be determined, as well as the time to transition between the states. Additionally, as described herein, a server sleep state selection can be part of a planning phase and can be implemented with a deterministic algorithm.

One or more embodiments of the invention can also include tracking multiple active and sleep states of every server in a cluster and the workload history for each server. By considering the power consumption for each state as well as the transition times, one or more embodiments of the invention schedule the transition between various active and sleep states to meet the agreed workload level requirements.

Figure 1:
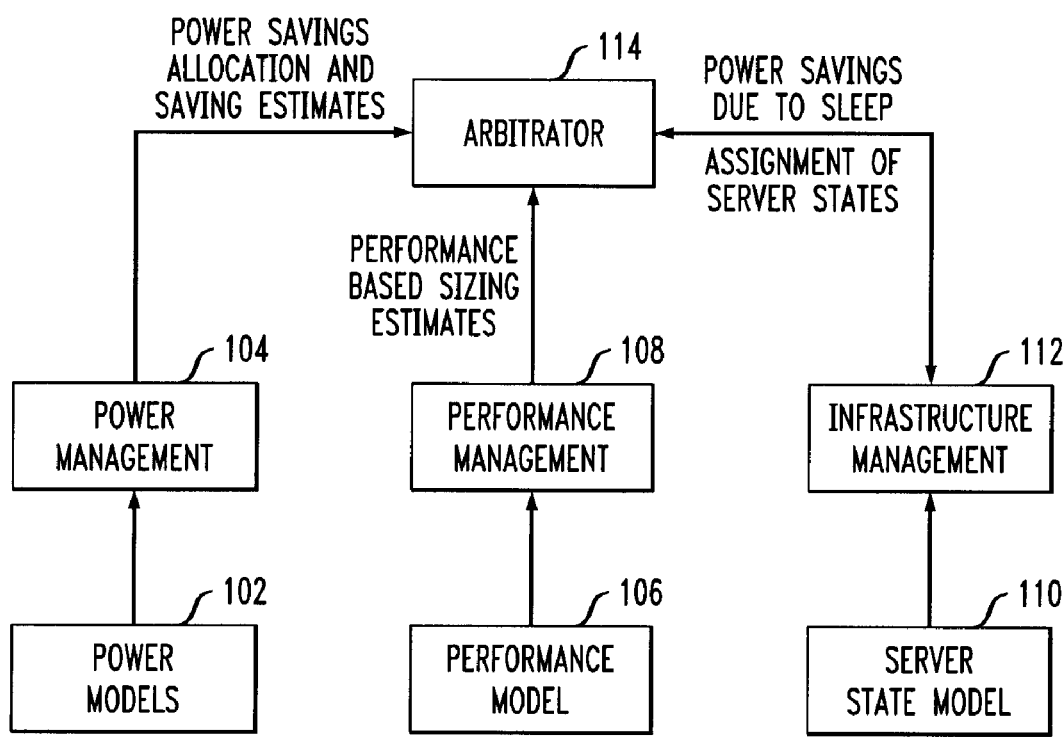
FIG. 1 is a diagram illustrating architecture for dynamic selection of server states, according to an embodiment of the present invention.

FIG. 1 is a diagram illustrating architecture for dynamic selection of server states, according to an embodiment of the present invention. By way of illustration, FIG. 1 depicts a power model module 102, which provides input to a power management module 104. Additionally, FIG. 1 depicts a performance model module 106, which provides input to a performance management module 108. FIG. 1 additionally depicts a server state model module 110, which provides input to an infrastructure management module 112.

The power model module 102 provides an estimate for the power drawn by the servers for a given resource allocation.

The performance model module 106 similarly provides an estimate about the performance of the applications for a given resource allocation. Also, the server state model module 110 provides details about all of the states available in a server, the power consumed in each state, and the cost of transitioning from one state to another.

The power management module 104 provides input (for example, power savings allocation and savings estimates) to an arbitrator module 114. The performance management module 108 provides input (for example, performance-based sizing estimates) to the arbitrator module 114. Also, the infrastructure management module 112 and the arbitrator module 114 interact to determine an assignment of server states.

The infrastructure management module 112 triggers the state for each server as directed by the arbitrator module 114 at any given point in time, and passes on the different states available (and their properties) in a server as given by the server state model module 110. All the decisions are made by the arbitrator module 114.

As described herein, one or more embodiments of the invention include power minimization formulations. Additionally, all equations performed in one or more embodiments of the invention can be carried out, for example, by a component such as the arbitrator module (component 114 in FIG. 1). By way of example, consider time period T divided into w discrete intervals $[t_0, t_1, \ldots t_w]$. For each discrete time interval t, one or more embodiments of the invention compute how many servers need to be active and how many servers should be sent to sleep mode, given the application workload and service level agreements (SLAs). Given N servers of same type (homogeneous), one or more embodiments of the invention output the tuple $(n_0, t_0)$, where $n_0$=the number of active servers, and $t_0$=time interval. Given M types of servers (heterogeneous), one or more embodiments of the invention output m tuples $(n\_1_0, t_0), (n\_2_0, t_0), \ldots (n\_m_0, t_0)$, where $n\_i_t$=the number of active servers of type i at time interval t.

Additionally, for each discrete time interval t, one or more embodiments of the invention compute which servers are picked within a type and what are their operating modes. For homogeneous servers, one can choose any N. For heterogeneous servers, one can choose the N most power-efficient servers. One or more embodiments of the invention include selecting the suitable operating state for the servers such that power is minimized while satisfying application SLAs.

Also, for each discrete time interval t, one or more embodiments of the invention can compute, among the inactive servers, the most optimal sleep state to transition the servers. Additionally one or more embodiments of the invention include computing, for the period T, a schedule for the sleep and wake-up transitions of the servers, taking into account the power consumption and time spent during state transitions.

Additionally, one or more embodiments of the invention include minimizing power and migration cost. By way of example, for each consolidation window, one can, in a first phase, select a number of active servers satisfying performance constraints for each time interval t. In a second phase, one can select the active server set {AS} and their operating modes for each time interval t. Also, one can, in a third phase, select the sleep state and a schedule for initiating transitions for the entire period T.

One or more embodiments of the invention can further include selecting the number of active servers, wherein a consolidation window=T, divided into $[t_0, t_1, \ldots t_w]$. Given the workload models, one can represent the active servers as time-series data over the set of intervals $[t_0, t_1, \ldots t_w]$. Additionally, one or more embodiments of the invention can find, across all workloads, the aggregate resource usage $R_i$, for each time interval $t_i$, as well as find the least number of servers of each type needed to satisfy aggregate $R_i$ and $t_i$, for each i.

The techniques detailed herein can also include selecting an active server set and operating modes {AS}. By way of example, consider a consolidation window=T. Also, one can categorize all sleep states of selected server types into a set of intervals S, and $\{AS\}_i$=all servers selected for interval i and their operating states. For the largest s in S, one or more embodiments of the invention can run pMapper or any well-known consolidation algorithm that returns the set of servers that satisfies performance SLAs while minimizing cost. The operating states of the set of servers can be determined, and, as such, $\{AS\}_i$=a new set of selected active servers in this consolidation window and their operating states. Further, one or more embodiments of the invention include repeating these steps for the next biggest interval.

Additionally, the techniques described herein include selecting the sleep states for each interval and a schedule for period T. $\{AS\}_{T\_k}$ includes servers that need to be turned to active at time T_k according to the steps detailed above. Also, $\{Sleep\}_{T\_k}$ includes $\{All\_AS\}-\{AS\}_{T\_k}$=servers that need to be put to sleep in period T_k.

Further, each server in sleep state S_i has 3 components:
Switching time from active to S_i (transFromActive_S_i) (power consumed=$\rho\_S\_i_{transFromActive}$);
Minimum idling time (minIdleTime_S_i) (power consumed=$\rho\_S\_i$); and
Switching time from S_i to active (transToActive_S_i) (power consumed=$\rho\_S\_i_{transToActive}$).

In connection with the selection of sleep states, for each server in $\{Sleep\}_{T\_k}$ with a idle period $I_i$, one or more embodiments of the invention include selecting the sleep state where transFromActive_S_i+minIdleTime_S_i+transToActive_S_i<$I_i$, and where ΔPowerSavings=(power saved in sleep state−power consumed in state transition) is the maximum.

In connection with determining a schedule for switching between sleep and active modes, one or more embodiments of the invention include determining a schedule for switching such that each server that needs to transition to sleep at time T_k finishes switching at T_(k+1)−minIdleTime_S_i−transToActive_S_i, and can begin switching as early as at T_k. Additionally, the schedule for switching can be determined such that each server that needs to transition to active at time T_k begins switching at least by T_k−transToActive_S_i and finishes switching by T_k.

Further, as detailed herein, in switching to sleep modes, switching as early as possible yields higher power savings. Also, in switching to active power mode, switching as late as possible yields higher power savings, but transitioning all servers together may create power spikes.

Also, in one or more embodiments of the invention, minimizing power and migration cost can include workload prediction (for example, moving average, exponential, linear regression, etc.) and idle period prediction. A last period predictor can include the last idle period value being the new idle period, and exponential p=λp+(1−λ)l. In one or more embodiments of the invention, the structure of the algorithm can remain unchanged, and prediction errors can be incorporated to minimize performance loss.

One or more embodiments of the invention can also include calculating adjusted switching times. By way of example, if an idle period ends earlier, each server that is predicted to be active at time T_k must start switching at [T_k−TransToActive_S_i−Error Term] (to account for idle period ending early). Also, one or more embodiments of the invention can include delayed switching back to active modes with error consideration. If an idle period begins later, each server that needs to transition to sleep at time T_k must start switching at the beginning of T_k+Error Term (to account for idle period beginning later). Also, one or more embodiments of the invention can include switching to low power modes with error consideration. If errors in idle period beginning early and ending later, no performance penalties will be noted; only power penalties.

As described herein, one or more embodiments of the invention include assigning server states on a heterogeneous server cluster in a manner such that where for an interval, each server may be either actively serving workload in one of its operating states or be assigned to one among an ordered set of sleep states. By way of example, active states $A=[O_0, O_1, \ldots O_i]$ or sleep states $S=[S_0, S_1, \ldots S_i]$, where each active state $O_i$ is ordered by its depth i, representing that the performance in state $O_i$ is more than the performance in $O_{i+1}$, and the power consumed in $O_i$ is more than the power consumed in state $O_{i+1}$. Also, each sleep state $S_i$, for a server is ordered by its depth i, representing that the switching time (that is, the time to go from $S_i$ to active and vice-versa) is less than switching time of $S_{i+1}$, and the power consumed in $S_i$ is more than the power consumed in state $S_{i+1}$. Further, each state transition is associated with a time and power consumption.

Figure 2:
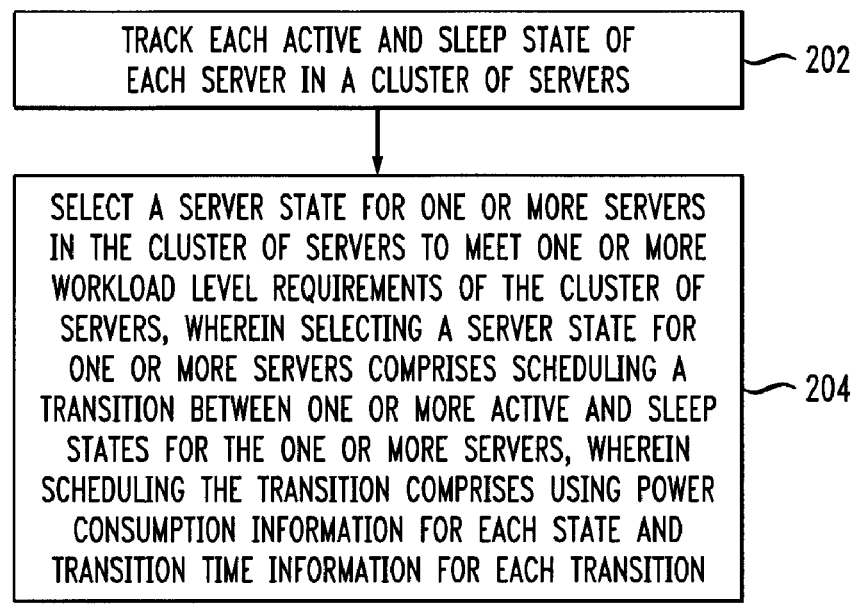
FIG. 2 is a flow diagram illustrating techniques for dynamically selecting a server state for one or more servers in a cluster of servers, according to an embodiment of the invention.

FIG. 2 is a flow diagram illustrating techniques for dynamically selecting a server state for one or more servers in a cluster of servers, according to an embodiment of the present invention. Step 202 includes tracking each active and sleep state of each server in a cluster of servers.

Step 204 includes selecting a server state for one or more servers in the cluster of servers to meet one or more workload level requirements of the cluster of servers, wherein selecting a server state for one or more servers comprises scheduling a transition between one or more active (including one or more operating states) and sleep states for the one or more servers, wherein scheduling the transition comprises using power consumption information for each state and transition time information for each transition. The workload level requirements can include, for example, performance goals, minimizing aggregate server power costs, etc.

Scheduling a transition between active and sleep states for the servers can include determining how many of the one or more servers should be in an active state and how many of the one or more servers should be in a sleep state. Determining how many of the one or more servers should be in a sleep state can include, for example, determining which among multiple sleep states to place each inactive server.

Additionally, in one or more embodiments of the invention, dynamically selecting a server state for servers in a cluster of servers can be performed, for example, offline with complete information and perfect look-ahead, and/or at run-time with a predictive look-ahead.

The techniques depicted in FIG. 2 can also, as described herein, be run on a system (as well as provide a system on which to run the detailed techniques), wherein the system includes distinct software modules, each of the distinct software modules being embodied on a tangible computer-readable recordable storage medium. The distinct software modules can include, for example, a power model module, a performance model module, a server state model module, a power management module, a performance management module, an infrastructure management module and an arbitrator module executing on a hardware processor.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 3:
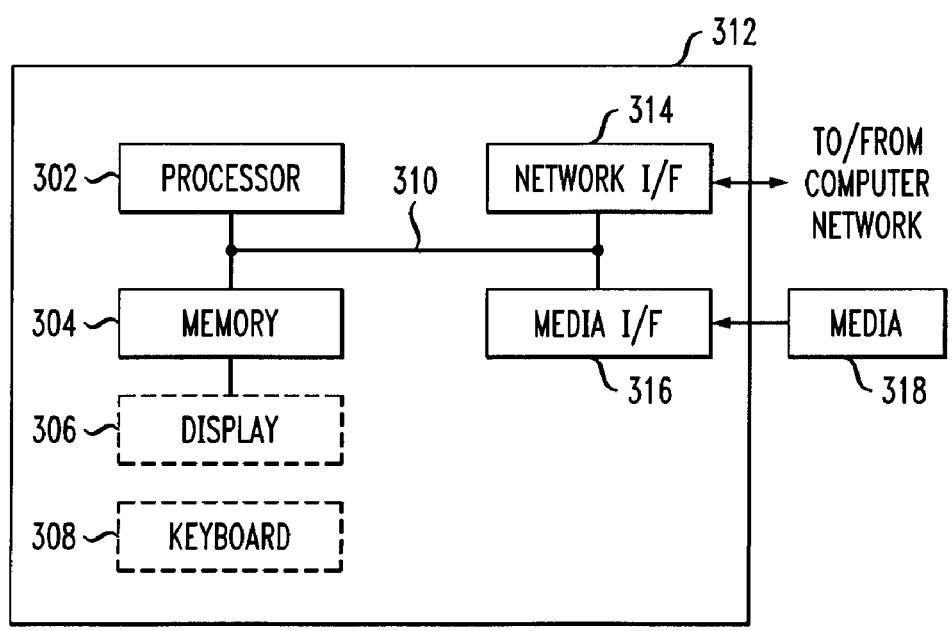
FIG. 3 is a system diagram of an exemplary computer system on which at least one embodiment of the invention can be implemented.

One or more embodiments can make use of software running on a general purpose computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

Furthermore, the invention can take the form of a computer program product accessible from a computer-usable or computer-readable medium (for example, media 318) providing program code for use by or in connection with a computer or any instruction implementation system. For the purposes of this description, a computer usable or computer readable medium can be any apparatus for use by or in connection with the instruction implementation system, apparatus, or device.

The medium can store program code to implement one or more method steps set forth herein.

The medium can be an electronic, magnetic, optical, electromagnetic, infrared, or semiconductor system (or apparatus or device) or a propagation medium. Examples of a tangible computer-readable storage medium include a semiconductor or solid-state memory (for example memory 304), magnetic tape, a removable computer diskette (for example media 318), a random access memory (RAM), a read-only memory (ROM), a rigid magnetic disk and an optical disk (but exclude a propagation medium). Current examples of optical disks include compact disk-read only memory (CD-ROM), compact disk-read/write (CD-R/W) and DVD.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium; the modules can include any or all of the components shown in FIG. 1. The method steps can then be carried out using the distinct software modules and/or sub-modules of the system, as described above, executing on a hardware processor. Further, a computer program product can include a tangible computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, assigning server states on a heterogeneous server cluster in a manner such that application performance goals are met and aggregate server power costs are minimized.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for dynamically selecting a server state for one or more servers in a cluster of servers, wherein the method comprises:
tracking each active and sleep state of each server in a cluster of servers; and
selecting a server state for one or more servers in the cluster of servers to meet one or more workload level requirements of the cluster of servers for a time period divided into multiple discrete time intervals, wherein selecting a server state for one or more servers comprises scheduling a transition between one or more active and sleep states for the one or more servers for each of multiple discrete time intervals within the time period, wherein scheduling the transition comprises using power consumption information for each state and transition time information for each transition for each of the multiple discrete time intervals within the time period, wherein transition time information includes switching time from active state to sleep state, idling time, and switching time from sleep state to active state.

2. The method of claim 1, wherein one or more workload level requirements comprise one or more performance goals.

3. The method of claim 1, wherein one or more workload level requirements comprise minimizing aggregate server power costs.

4. The method of claim 1, wherein scheduling a transition between one or more active and sleep states for the one or more servers comprises determining how many of the one or more servers should be in an active state and how many of the one or more servers should be in a sleep state.

5. The method of claim 4, wherein determining how many of the one or more servers should be in a sleep state comprises determining which among multiple sleep states to place each inactive server.

6. The method of claim 1, wherein the one or more active states comprise one or more operating states.

7. The method of claim 1, wherein dynamically selecting a server state for one or more servers in a cluster of servers comprises dynamically selecting a server state for one or more servers in a cluster of servers offline with complete information and perfect look-ahead.

8. The method of claim 1, wherein dynamically selecting a server state for one or more servers in a cluster of servers comprises dynamically selecting a server state for one or more servers in a cluster of servers at run-time with a predictive look-ahead.

9. The method of claim 1, further comprising selecting an active server set and one or more operating states $\{AS\}$, wherein all sleep states of selected server types are categorized into a set of intervals S, wherein $\{AS\}_i$=all servers selected for interval i and their operating states, and wherein for a largest interval in S, a consolidation algorithm returns a set of servers that satisfies one or more performance service level agreements while minimizing cost.

10. The method of claim 1, further comprising providing a system, wherein the system comprises one or more distinct software modules, each of the one or more distinct software modules being embodied on a tangible computer-readable recordable storage medium, and wherein the one or more distinct software modules comprise a power model module, a performance model module, a server state model module, a power management module, a performance management module, an infrastructure management module and an arbitrator module executing on a hardware processor.

11. A computer program product comprising a tangible computer readable recordable storage medium including computer useable program code for dynamically selecting a server state for one or more servers in a cluster of servers, the computer program product including:
computer useable program code for tracking each active and sleep state of each server in a cluster of servers; and
computer useable program code for selecting a server state for one or more servers in the cluster of servers to meet one or more workload level requirements of the cluster of servers for a time period divided into multiple discrete time intervals, wherein selecting a server state for one or more servers comprises scheduling a transition between one or more active and sleep states for the one or more servers for each of multiple discrete time intervals within the time period, wherein scheduling the transition comprises using power consumption information for each state and transition time information for each transition for each of the multiple discrete time intervals within the time period, wherein transition time information includes switching time from active state to sleep state, idling time, and switching time from sleep state to active state.

12. The computer program product of claim 11, wherein the computer useable program code for scheduling a transition between one or more active and sleep states for the one or more servers comprises computer useable program code for determining how many of the one or more servers should be in an active state and how many of the one or more servers should be in a sleep state.

13. The computer program product of claim 11, wherein the computer useable program code for dynamically selecting a server state for one or more servers in a cluster of servers comprises computer useable program code for dynamically selecting a server state for one or more servers in a cluster of servers offline with complete information and perfect look-ahead.

14. The computer program product of claim 11, wherein the computer useable program code for dynamically selecting a server state for one or more servers in a cluster of servers comprises computer useable program code for dynamically selecting a server state for one or more servers in a cluster of servers at run-time with a predictive look-ahead.

15. The computer program product of claim 11, wherein the computer usable program code comprises one or more distinct software modules, and wherein the one or more distinct software modules comprise a power model module, a performance model module, a server state model module, a power management module, a performance management module, an infrastructure management module and an arbitrator module executing on a hardware processor.

16. A system for dynamically selecting a server state for one or more servers in a cluster of servers, comprising:
a memory; and
at least one processor coupled to the memory and operative to:

track each active and sleep state of each server in a cluster of servers; and select a server state for one or more servers in the cluster of servers to meet one or more workload level requirements of the cluster of servers for a time period divided into multiple discrete time intervals, wherein selecting a server state for one or more servers comprises scheduling a transition between one or more active and sleep states for the one or more servers for each of multiple discrete time intervals within the time period, wherein scheduling the transition comprises using power consumption information for each state and transition time information for each transition for each of the multiple discrete time intervals within the time period, wherein transition time information includes switching time from active state to sleep state, idling time, and switching time from sleep state to active state.

17. The system of claim 16, wherein the at least one processor coupled to the memory operative to schedule a transition between one or more active and sleep states for the one or more servers is further operative to determine how many of the one or more servers should be in an active state and how many of the one or more servers should be in a sleep state.

18. The system of claim 16, wherein the at least one processor coupled to the memory operative to dynamically select a server state for one or more servers in a cluster of servers is further operative to dynamically select a server state for one or more servers in a cluster of servers offline with complete information and perfect look-ahead.

19. The system of claim 16, wherein the at least one processor coupled to the memory operative to dynamically select a server state for one or more servers in a cluster of servers is further operative to dynamically select a server state for one or more servers in a cluster of servers at run-time with a predictive look-ahead.

20. The system of claim 16, further comprising a tangible computer-readable recordable storage medium having one or more distinct software modules embodied thereon, the one or more distinct software modules comprising a power model module, a performance model module, a server state model module, a power management module, a performance management module, an infrastructure management module and an arbitrator module executing on a hardware processor.

* * * * *